United States Patent
Morishita

(10) Patent No.: US 12,065,212 B2
(45) Date of Patent: Aug. 20, 2024

(54) FRONT FORK

(71) Applicant: HITACHI ASTEMO, LTD., Hitachinaka (JP)

(72) Inventor: Isao Morishita, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 668 days.

(21) Appl. No.: 17/232,727

(22) Filed: Apr. 16, 2021

(65) Prior Publication Data

US 2021/0253194 A1 Aug. 19, 2021

Related U.S. Application Data

(63) Continuation of application No. PCT/JP2018/046713, filed on Dec. 19, 2018.

(51) Int. Cl.
| | | |
|---|---|---|
| B62K 21/02 | (2006.01) | |
| B62K 21/00 | (2006.01) | |
| B62K 21/08 | (2006.01) | |
| F16F 9/06 | (2006.01) | |
| F16F 9/32 | (2006.01) | |

(52) U.S. Cl.
CPC ............ B62K 21/02 (2013.01); *B62K 21/005* (2013.01); *B62K 21/08* (2013.01); *F16F 9/065* (2013.01); *F16F 9/3242* (2013.01)

(58) Field of Classification Search
CPC ...... B62K 21/02; B62K 25/08; B62K 21/005; B62K 21/08; F16F 9/065; F16F 9/3242
See application file for complete search history.

(56) References Cited

U.S. PATENT DOCUMENTS

| | | | | |
|---|---|---|---|---|
| 2008/0053765 | A1* | 3/2008 | Tomonaga | B62K 25/08 |
| | | | | 188/315 |
| 2010/0117321 | A1* | 5/2010 | Achenbach | F16F 9/46 |
| | | | | 280/124.102 |
| 2010/0117322 | A1* | 5/2010 | Achenbach | B62K 25/08 |
| | | | | 280/124.102 |

FOREIGN PATENT DOCUMENTS

| | | |
|---|---|---|
| CH | 298015 A | 4/1954 |
| JP | 2008-057591 A | 3/2008 |
| JP | 2010-059985 A | 3/2010 |

(Continued)

OTHER PUBLICATIONS

German Office Action mailed Apr. 25, 2023 for the corresponding German Patent Application No. 112018008004.8 (6 pages including English translation).

(Continued)

*Primary Examiner* — Kevin Hurley
*Assistant Examiner* — Marlon A Arce
(74) *Attorney, Agent, or Firm* — Leason Ellis LLP; Edward J. Ellis; Melvin C. Garner

(57) ABSTRACT

A front fork includes a tubular outer tube, a tubular inner tube which is provided inside the outer tube and is relatively movably connected to the outer tube, and a connecting member which connects a wheel and the inner tube. The inner tube has a first contact portion which has a first surface and comes into contact with the connecting member. The connecting member includes a second contact portion having a second surface and coming into contact with the first contact portion and a space forming portion which forms a space in an axial direction in a state where the first surface of the first contact portion and the second surface of the second contact portion are in contact with each other.

15 Claims, 12 Drawing Sheets

(56) References Cited

FOREIGN PATENT DOCUMENTS

JP       2014-069640 A     4/2014
JP       2017-180692 A    10/2017

OTHER PUBLICATIONS

International Search Report mailed Mar. 19, 2019 for the corresponding PCT International Patent Application No. PCT/JP2018/046713.
Written Opinion mailed Mar. 19, 2019 for the corresponding PCT International Patent Application No. PCT/JP2018/046713.

* cited by examiner

FRONT FORK

CROSS-REFERENCE TO RELATED APPLICATION

This application is a continuation of PCT Application No. PCT/JP2018/046713, which was filed on Dec. 19, 2018, the content of which is incorporated herein by reference in its entirety.

FIELD OF THE INVENTION

The present invention relates to a front fork.

BACKGROUND OF THE INVENTION

For example, Patent Literature 1 discloses a front fork including a telescopic portion, a damping force generating unit, and a volume compensating portion. This telescopic portion includes an outer tube portion, an inner tube, a spring collar, an outer cylinder, a damper cylinder, an axle bracket portion, a rod portion, and a spring. Further, Patent Literature 1 discloses that the axle bracket portion has a tube holding portion, an axle connecting portion, and a cylinder holder and is arranged on an axle side of the inner tube.

Patent Literature 1: Japanese Unexamined Patent Publication No. 2017-180692

There are cases where a gap must be provided between a plurality of members forming the front fork of Patent Literature 1, for example, for assembling the members. Then, for example, when braking is applied in a vehicle, a bending load is applied to the front fork. In this case, the front fork is deformed by the bending load, so that the plurality of members having a gap may shift from a non-contact state in which the gap is maintained to a contact state in which at least a part of the members are in contact with each other. Therefore, in the front fork of Patent Literature 1, the rigidity as the front fork may change depending on the state of non-contact or contact between the members due to the deformation. This change in the rigidity of the front fork could affect the braking sensation of the motorcycle rider.

An object of the invention is to provide a front fork which suppresses a change in rigidity due to an application of a bending load.

SUMMARY OF THE INVENTION

As a result of diligent studies, the inventor has found that it is possible to provide a front fork where (a) a tubular member (for example, a slide pipe) forming the front fork and a connecting member (for example, an axle holder) for connecting the tubular member and a wheel are brought into contact with each other via a pair of surfaces forming an angle θ (0) with an outer peripheral surface of the tubular member, which is arranged in a portion of the tubular member interposed between both axial end surfaces of the tubular member and (b) changes in rigidity due to the application of a bending load are suppressed by holding an annular member and a connecting member without contacting the end surface of the tubular member adjacent to and facing the connecting member with the connecting member. The invention has been completed based on this finding. Hereinafter, the invention will be described. In the following description, reference numerals and letters in the accompanying drawings are added in parentheses to facilitate understanding of the invention, but the invention is not limited to the illustrated form.

According to a first aspect of the present invention, there is provided a front fork which includes a tubular outer tube (31) which is provided on one side, which is a side on which a steering unit (12) is arranged in an axial direction, a tubular inner tube (40, 80) which is provided on the other side, which is a side on which a wheel (2) is arranged in the axial direction, and inside the outer tube (31) and is relatively movably connected to the outer tube (31), and a connecting member (60, 90) which connects the wheel (2) and the inner tube (40, 80), where the inner tube (40, 80) has a first contact portion (41, 81) which has a surface (41P, 81P) facing the other side further on the one side than an end surface (45P, 83P) on the other side of the inner tube (40, 80) and comes into contact with the connecting member and the connecting member (60, 90) includes a second contact portion (683, 913) having a surface (683P, 913P) facing the one side and coming into contact with the first contact portion (41, 81) and a space forming portion (682, 912) which forms a space against the end surface (45P, 83P) of the inner tube (40, 80) in the axial direction in a state where the first contact portion (41, 81) and the second contact portion (683, 913) are in contact with each other.

Here, the first contact portion (41) can be a step connecting an outer peripheral surface (40a) of the inner tube (40) and a recessed surface (40k) recessed inward in a radial direction of the inner tube (40) from the outer peripheral surface (40a), and the second contact portion (683) of the connecting member (63) can come into contact with the first contact portion (41) on an outer circumference of the inner tube (40).

Further, the outer peripheral surface (40a) can be provided in a first outer diameter portion having the largest outer diameter in the inner tube (40) and the recessed surface (40k) can be provided in a second outer diameter portion having an outer diameter smaller than that of the first outer diameter portion.

The inner tube (40) can include a first inner diameter portion having a predetermined inner diameter and provided inside the first outer diameter portion and a second inner diameter portion having an inner diameter smaller than that of the first inner diameter portion and provided inside the second outer diameter portion.

Also, it is preferable that the inner tube (40) have a tapered portion (43) connecting the first inner diameter portion and the second inner diameter portion.

Here, the first contact portion (81) can be a step connecting an inner peripheral surface (80b) of the inner tube (80) and a protruding surface (80t) protruding inward in a radial direction of the inner tube (80) from the inner peripheral surface (80b), and the second contact portion (913) of the connecting member (90) can come into contact with the first contact portion (81) on an inner circumference of the inner tube (80).

Further, it is preferable that the first contact portion (81) have a tapered portion (84) on the one side of the step.

the inner tube (40, 80) can be connected to the connecting member (60, 90) by fastening a screw.

According to a second aspect of the present invention, there is provided a front fork which includes a first tubular member (31) which is provided on one side, which is a side on which a steering unit (12) is arranged in an axial direction, a second tubular member (40, 80) which is coaxially provided with the first tubular member (31) on the other side, which is a side on which a wheel (2) is arranged in the axial direction, and is relatively movably connected to the first tubular member (31); and a connecting member (60, 90) which connects the wheel (2) and the second tubular member (40, 80), where the second tubular member (40, 80) has a first contact portion (41, 81) which has a surface (41P, 81P) facing the other side further on the one side than an end surface (45P, 83P) on the other side of the second tubular member (40, 80) and comes into contact with the connecting member (60, 90) and the connecting member (60, 90) includes a second contact portion (683, 913) having a surface (683P, 913P) facing the one side and coming into contact with the first contact portion (41, 81) and a space forming portion (682, 912) which forms a space against the end surface of the second tubular member (40, 80) in the axial direction in a state where the first contact portion (41, 81) and the second contact portion (683, 913) are in contact with each other.

Advantageous Effects of Invention

According to the invention, it is possible to provide a front fork which suppresses a change in rigidity due to an application of a bending load.

DETAILED DESCRIPTION OF THE INVENTION

Hereinafter, embodiments of the invention will be described in detail with reference to the accompanying drawings.

First Embodiment

Figure 1:
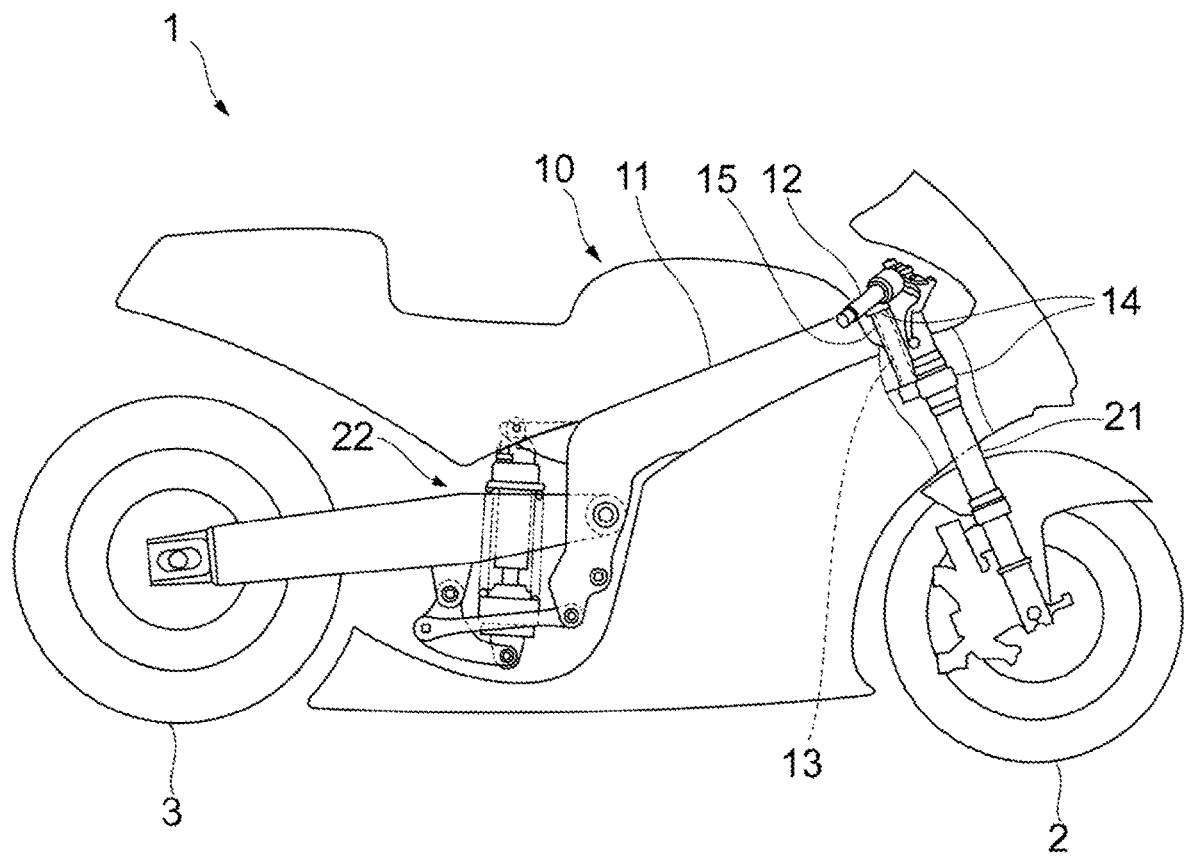
FIG. 1 is a diagram illustrating a schematic configuration of a motorcycle 1.

FIG. 1 is a diagram illustrating a schematic configuration of a motorcycle 1.
As illustrated in FIG. 1, the motorcycle 1 includes a front wheel 2 which is a wheel on a front side, a rear wheel 3 which is a wheel on a rear side, and a vehicle body 10. Here, the vehicle body 10 includes a frame 11 which forms the skeleton of the motorcycle 1, a handle bar 12, an engine (not illustrated), and the like.
Further, the motorcycle 1 includes a pair of left and right front forks 21 which connect the front wheels 2 and the vehicle body 10 and a suspension 22 which connects the rear wheel 3 and the vehicle body 10. Further, the motorcycle 1 includes two brackets 14 for holding the pair of front forks 21 and a stem shaft 13 arranged between the two brackets 14. The stem shaft 13 is rotatably supported by a head pipe 15 of the frame 11.

Figure 2:
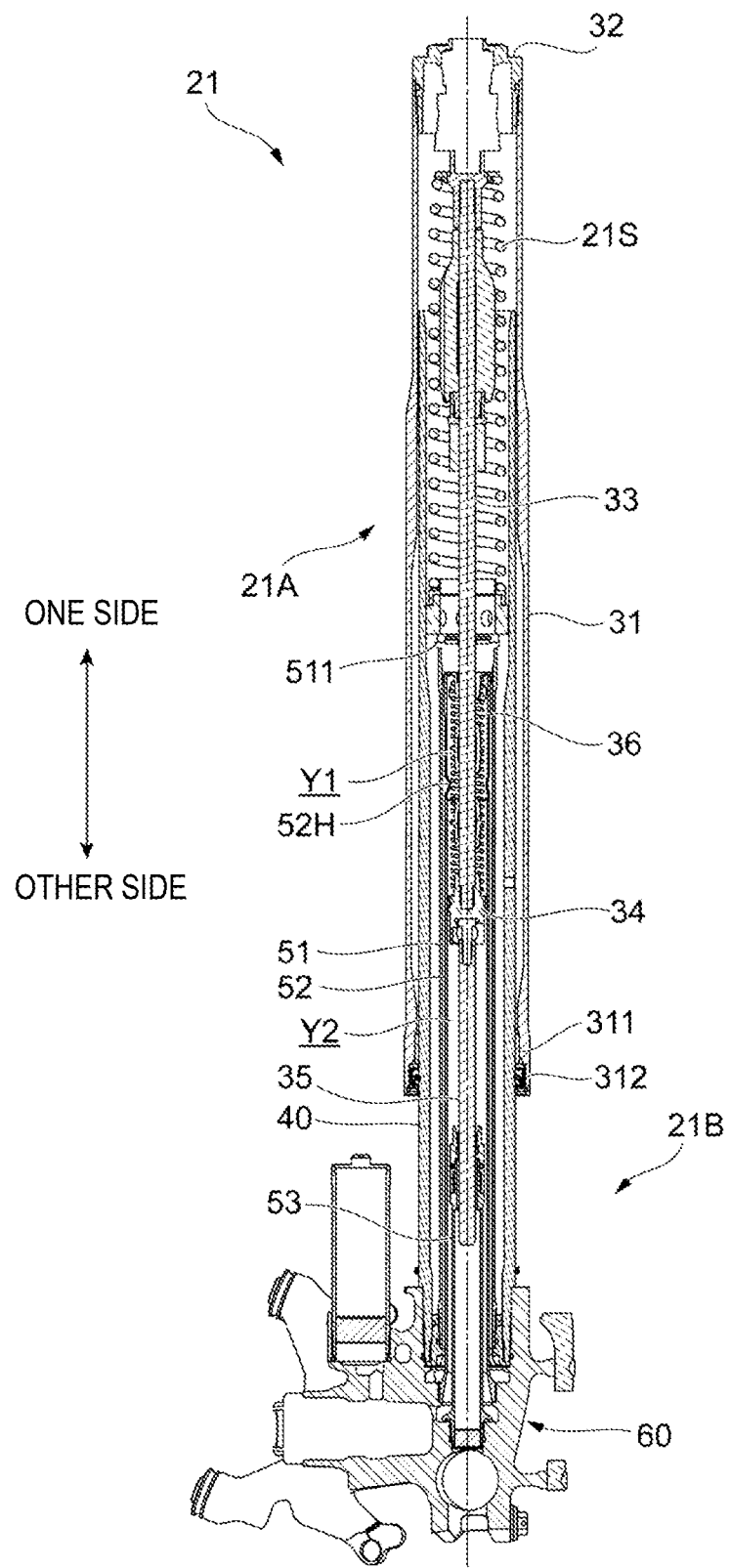
FIG. 2 is an overall view of a front fork 21.

FIG. 2 is an overall view of the front fork 21.
As illustrated in FIG. 2, the front fork 21 includes a first unit 21A attached to one side on which the handle bar 12 (see FIG. 1) is provided and a second unit 21B attached to the other side on which the front wheel 2 (see FIG. 1) is provided. Further, the front fork 21 is arranged between the first unit 21A and the second unit 21B and includes a first spring 21S which absorbs an impact received by the front wheel 2 due to the unevenness of the road surface.
The front fork 21 suppresses vibration by absorbing the impact received by the front wheel 2 due to the unevenness of the road surface while supporting the front wheel 2 by the relative movement of the first unit 21A and the second unit 21B in an axial direction.
In the following description, a direction of a cylindrical center line of the outer tube 31 provided in the first unit 21A and the inner tube 40 (described below) provided in the second unit 21B is referred to as an "axial direction". Further, in the axial direction, the handle bar 12 side is referred to as "one side" and the front wheel 2 side is referred to as "the other side".

First Unit 21A

The first unit 21A includes a tubular outer tube 31 with one side and the other side open in the axial direction, a cap 32 which covers the opening on one side of the outer tube 31, and a first rod 33 extending in the axial direction. In addition, the first unit 21A includes a piston 34 fixed to the other end of the first rod 33, a second rod 35 provided on the other side of the first rod 33, and the second spring 36 provided between the piston 34 and an end member 511 described below.
The outer tube 31 (an example of the first tubular member) is a substantially circular tubular member. The inner diameter of the outer tube 31 is formed to be larger than the outer diameter of an inner tube 40. Also, the outer tube 31 accommodates the inner tube 40 and the first spring 21S inside in a radial direction.
Further, a bush 311 and a seal member 312 are provided at the other end of the outer tube 31. The outer tube 31 is relatively movably connected to the inner tube 40 via the bush 311 and the seal member 312.
The cap 32 covers one end of the outer tube 31 and suppresses the outflow of oil inside. Further, the cap 32 holds one end of the first rod 33.
The other side of the first rod 33 is inserted inside a second cylinder 52 (described below). Then, the first rod 33 moves relative to the second cylinder 52 as the first unit 21A and the second unit 21B move relative to each other.
The piston 34 divides the inside of the second cylinder 52 (described below) into a first oil chamber Y1 and a second oil chamber Y2. Further, the piston 34 slides in the axial direction with respect to the second cylinder 52 as the first rod 33 moves.
The other side of the second rod 35 is inserted into a third cylinder 53. Then, the second rod 35 moves relative to the third cylinder 53 as the first unit 21A and the second unit 21B move relative to each other.
The second spring 36 is arranged between the end member 511 (described below) and the piston 34. Also, the second spring 36 absorbs the impact when the first unit 21A and the second unit 21B move in the direction (the direction in which they move away) in which they extend most.

Second Unit 21B

Figure 3:
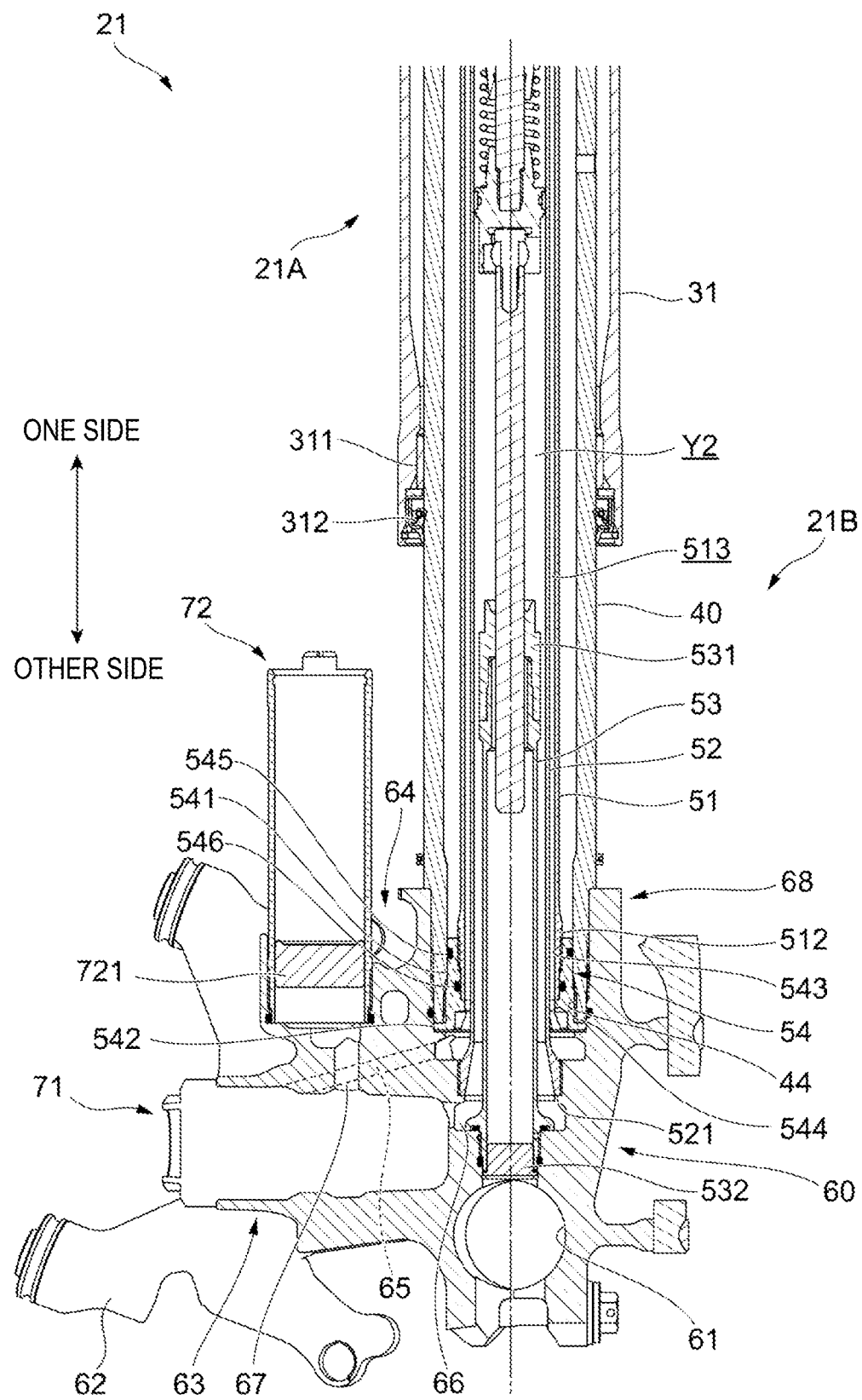
FIG. 3 is a diagram illustrating a second unit 21B.

FIG. 3 is a diagram illustrating the second unit 21B.

Figure 4:
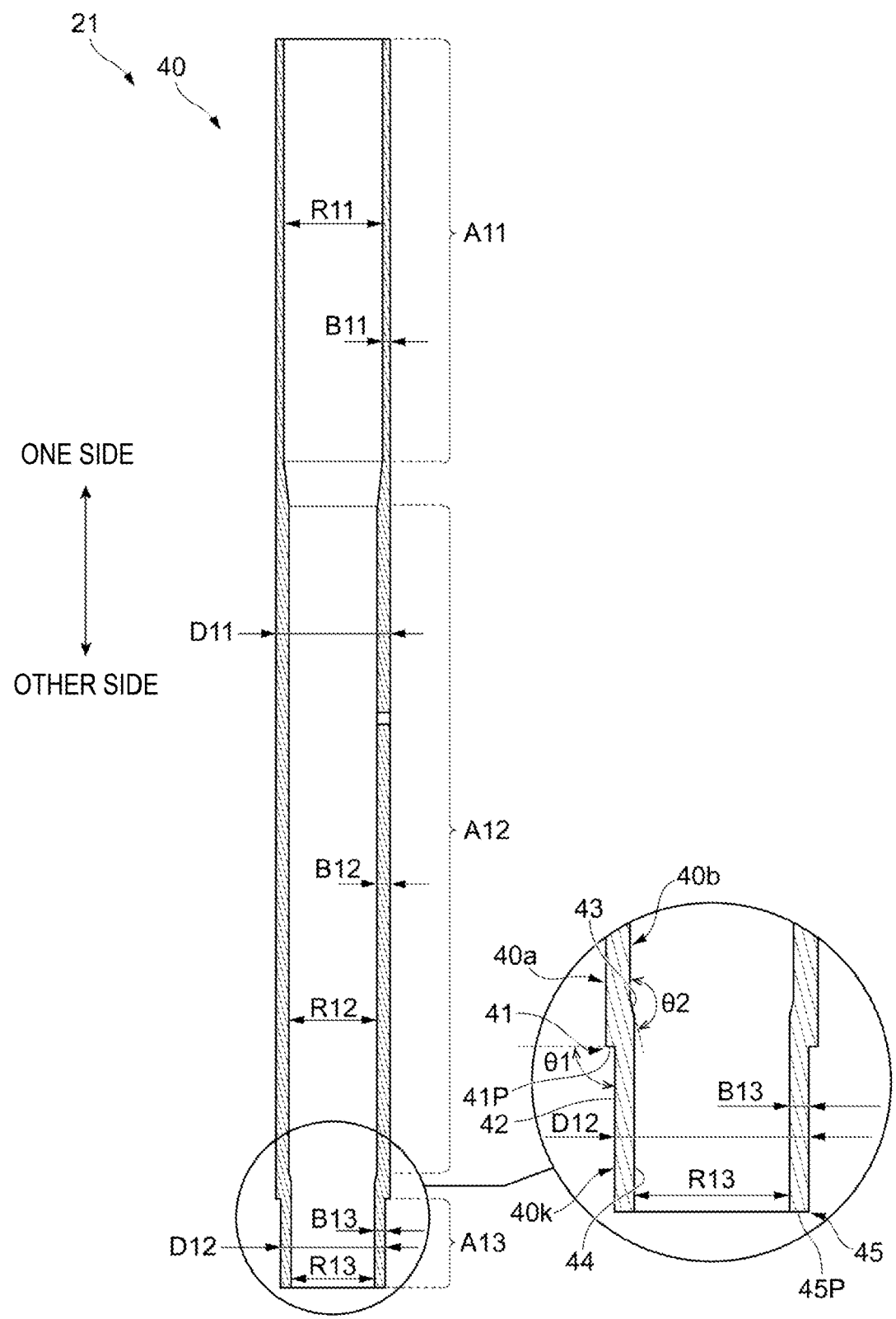
FIG. 4 is a cross-sectional view of an inner tube 40.

FIG. 4 is a cross-sectional view of the inner tube 40.

Figure 5:
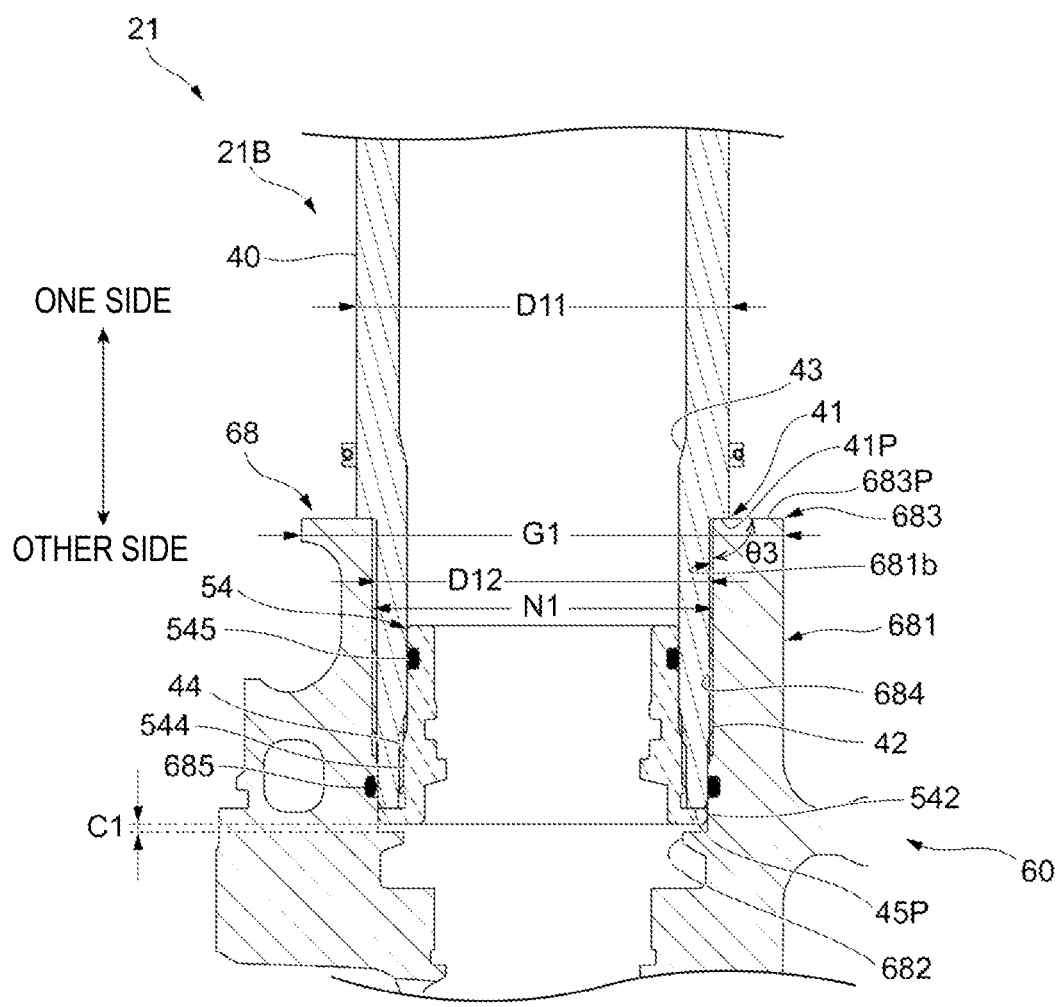
FIG. 5 is a diagram illustrating the inner tube 40 and an axle holder 60.

FIG. 5 is a diagram illustrating the inner tube 40 and an axle holder 60.

The second unit 21B includes the tubular inner tube 40 with one side and the other side open in the axial direction, a first cylinder 51 provided inside the inner tube 40 in the radial direction, the second cylinder 52 provided inside the first cylinder 51 in the radial direction, and the third cylinder 53 provided inside the second cylinder 52 in the radial direction. Further, the second unit 21B has a connecting member 54 on the other side of the inner tube 40. Furthermore, the second unit 21B includes the axle holder 60 which connects the inner tube 40 and the front wheel 2 (see FIG. 1), a damping force generating unit 71 which generates a damping force, and a pressurizing unit 72 which pressurizes the oil in the front fork 21.

Inner Tube 40

The inner tube 40 (an example of the second tubular member) is a substantially circular tubular member and an aluminum alloy is used as the material thereof.

In the invention, the material of the inner tube 40 is not limited to the aluminum alloy. However, the inner tube 40 preferably has a thickness of a predetermined thickness or more in order to facilitate the provision of a step portion 41 described below. It is preferable to use an aluminum alloy as the material of the inner tube 40 from the viewpoint of suppressing the increase in weight and easily increasing the thickness to a predetermined thickness or more.

As illustrated in FIG. 2, one side of the inner tube 40 is open and the first rod 33 and the first spring 21S are accommodated inside. Further, as illustrated in FIG. 3, the other side of the inner tube 40 is closed by the connecting member 54. Also, oil is injected into the inner tube 40.

Further, the inner tube 40 is connected to the axle holder 60 at the other end. The connection between the inner tube 40 and the axle holder 60 will be described in detail below.

As illustrated in FIG. 4, the inner tube 40 has a first region A11, a second region A12, and a third region A13 from one side to the other in the axial direction.

The first region A11 is a region having a largest outer diameter D11 in the inner tube 40 and a first inner diameter R11 having the largest inner diameter in the inner tube 40.

The second region A12 is a region in which the outer diameter is the first outer diameter D11 and the inner diameter is a second inner diameter R12 smaller than the first inner diameter R11.

The third region A13 is a region having a second outer diameter D12 having an outer diameter smaller than the first outer diameter D11 and a third inner diameter R13 having an inner diameter smaller than the second inner diameter R12.

The first region A11 is a region accommodated in the outer tube 31 and the outer tube 31 relatively moves around the outer circumference thereof. Further, the second region A12 is a region in which the bush 311 and the seal member 312 of the outer tube 31 slide on the outer circumference. Therefore, in the first region A11 and the second region A12, the outer diameter (first outer diameter D1) is made uniform along the axial direction.

The third region A13 is a region provided on the outer circumference of the inner tube 40 and forming a connection portion with the axle holder 60. As illustrated in FIG. 5, a male screw 42 is provided on the outer circumference of the third region A13 (see FIG. 4). The male screw 42 forms a connection portion of the axle holder 60 with a female screw 684 described below. Further, the male screw 42 is formed at a predetermined distance from the step portion 41 described below toward the other side and is formed at a predetermined distance from an end 45 on the other side of the inner tube 40 toward one side as well.

Then, as illustrated in FIG. 4, the inner tube 40 has the step portion 41 (an example of a first contact portion) at the boundary portion between the second region A12 and the third region A13 in the axial direction. As described above, the outer diameter of the second region A12 is the first outer diameter D11 and the outer diameter of the third region A13 is the second outer diameter D12, which is smaller than the first outer diameter D1 (D12<D11). The step portion 41 is a step connecting an outer peripheral surface 40a of the inner tube 40 and a recessed surface 40k recessed inward in the radial direction of the inner tube 40 from the outer peripheral surface 40a.

The step portion 41 has a step surface 41P which is a surface facing the other side in the axial direction. Since the inner tube 40 of the first embodiment has a cylindrical shape, the step surface 41P is an annular surface. Further, the step surface 41P of the first embodiment is substantially orthogonal to the recessed surface 40k. That is, an angle $\theta1$ formed by the step surface 41P with respect to the recessed surface 40k is approximately 90° ($\theta1 \approx 90°$).

However, in the first embodiment, the step surface 41P may be a surface facing the other side in the axial direction and the angle $\theta1$ formed with respect to the recessed surface 40k may be larger than 0° and smaller than 180° ($0° < \theta1 < 180°$).

If the inner tube 40 has a portion having a larger outer diameter than the first region A11 and the second region A12, when processing to form the moving portion of the outer tube 31 and the sliding surface of the bush 311 on the outside of the first region A11 and the second region A12, a part with a large outer diameter may become an obstacle and reduce workability. Therefore, in the inner tube 40, by making the outer diameters of the first region A11 and the second region A12 the largest and making the outer diameter of the third region A13 the second outer diameter D12, which is smaller than the first outer diameter D11, the step portion 41 is formed.

Further, the first region A11 has a region in which the first spring 21S (see FIG. 2) expands or contracts inward in the radial direction. In the inner tube 40, by making the first inner diameter R11 in the first region A11 larger than the second inner diameter R12 in the second region A12, the degree of freedom in designing the first spring 21S such as the overall diameter and the wire diameter of the first spring 21S is increased.

In the second region A12, a thickness B12 is made larger than, for example, a thickness B11 in the first region A11 by making the second inner diameter R12 smaller than the first inner diameter R11. The second region A12 has a sliding surface on the outer peripheral portion on which the bush 311 of the outer tube 31 slides. The second region A12 is a region forming a connection portion with the outer tube 31 in the inner tube 40 and is desired to have a predetermined rigidity. Therefore, the second region A12 has the thickness B12 which is thicker than the thickness B11.

In the third region A13, as described above, the second outer diameter D12 is made smaller than the first outer diameter D11 in order to form the step portion 41. Further, in the third region A13, a thickness B13 is made about the same as the thickness B12 by making the third inner diameter R13 smaller than the second inner diameter R12.

As a result, in the inner tube 40, the rigidity in the third region A13 is set to the same level as, for example, the second region A12.

Further, the third region A13 has a connection portion with a connection member 54 described below on the inner circumference thereof. A female screw 44 is provided on the inner circumference of the third region A13. The female screw 44 forms a connection portion with the male screw 544 of the connecting member 54 described below. Further, the female screw 44 is formed further on the other side than the male screw 42 described above in the axial direction. That is, the female screw 44 is formed at a position deviated from the male screw 42 in the axial direction.

As illustrated in FIG. 4, the inner tube 40 has a tapered portion 43 on the inner circumference thereof between the second region A12 and the third region A13. The tapered portion 43 is provided adjacent to the back surface side of the step portion 41 formed on the outer periphery. In the tapered portion 43, an angle θ2 formed by an inner peripheral surface 40b of the inner tube 40 is larger than 90° and smaller than 180° (90°<θ2<180°). Further, the tapered portion 43 gently connects the inner circumference of the second region A12 and the inner circumference of the third region A13.

As described above, the inner tube 40 has a step portion 41 on the outer circumference, and when a bending load is applied to the inner tube 40, the stress is concentrated on the step portion 41. Since the inner tube 40 has the tapered portion 43, the inner tube 40 to which the bending load is applied can be made difficult to break.

For example, the second inner diameter R12 of the second region A12 can be made the same as the third inner diameter R13 of the third region A13. However, the second inner diameter R12 is preferably larger than the third inner diameter R13 from the viewpoint of making it easy to suppress the weight increase of the front fork 21.

As illustrated in FIG. 4, the inner tube 40 has an end surface 45P at the end 45 on the other side. Since the inner tube 40 is cylindrical, the end surface 45P is an annular surface. Further, the end surface 45P is a surface facing the other side in the axial direction and is substantially orthogonal to the recessed surface 40k of the third region A13. The end surface 45P exists on the most other side in the axial direction among the surfaces facing the other side in the inner tube 40.

First Cylinder 51

As illustrated in FIG. 2, the first cylinder 51 is provided from the other side in the axial direction of the inner tube 40 to a substantially central portion. Then, the opening on one side of the first cylinder 51 is closed by the end member 511. Further, as illustrated in FIG. 3, a male screw 512 is formed on the outer peripheral portion on the other side of the first cylinder 51. The opening on the other side of the first cylinder 51 is closed by the connecting member 54. Further, the first cylinder 51 forms a flow path 513 through which oil flows between the first cylinder 51 and the second cylinder 52. The flow path 513 communicates with a first communication hole 65 described below of the axle holder 60 on the other side.

Second Cylinder 52

As illustrated in FIG. 2, the second cylinder 52 is arranged in the inner tube 40 at a position substantially similar to that of the first cylinder 51.

Also, the opening on one side of the second cylinder 52 is closed by the end member 511. Further, the second cylinder 52 has a through-hole 52H which is open in the radial direction on one side in a portion facing the flow path 513. The through-hole 52H allows the flow of oil between the first oil chamber Y1 and the flow path 513.

As illustrated in FIG. 3, the other side of the second cylinder 52 is held by the axle holder 60. Also, an opening portion 521 on the other side of the second cylinder 52 communicates with a second communication hole 66 described below of the axle holder 60.

Further, the inside of the second cylinder 52 is filled with oil which circulates with the damping force generating unit 71. Further, inside the second cylinder 52, the piston 34 fixed to the first rod 33 slides. In the second cylinder 52, along with the reciprocating movement of the piston 34 in the axial direction, an oil flow corresponding to a movement direction of the piston 34 is generated.

Third Cylinder 53

As illustrated in FIG. 3, the third cylinder 53 is arranged on the other side of the inner tube 40. On one side of the third cylinder 53, a lid member 531 is provided so as to allow the second rod 35 penetrate them and close the one end of the third cylinder 53. Further, on the other side of the third cylinder 53, a lid member 532 which closes the end portion on the other side is provided. Also, a gas such as air is airtight inside the third cylinder 53.

Then, the third cylinder 53 has the largest amount of entry of the second rod 35 when the front fork 21 contracts the most. In the third cylinder 53, the pressure of the gas inside increases as the amount of entry of the second rod 35 increases. Further, in the second rod 35, the pressure of the gas at the end on the other side is relatively high as compared with the pressure at the end on the one side. As a result, the second rod 35 is in a state where a force for moving toward one side is applied. As a result, in the front fork 21 of the first embodiment, the reaction force due to the gas is generated in the third cylinder 53 when the front fork 21 contracts most.

Connecting Member 54

As illustrated in FIG. 3, the connecting member 54 has a cylindrical portion 541 formed in a cylindrical shape and a flange portion 542 provided on the other side of the cylindrical portion 541.

The cylindrical portion 541 has a female screw 543 at the inner peripheral portion. The female screw 543 forms a connection portion with the male screw 512 of the first cylinder 51 described above. Further, the cylindrical portion 541 has a male screw 544 on the outer peripheral portion. The male screw 544 is formed at a position deviated from the female screw 543 in the axial direction. Then, the male screw 544 forms a connection portion with the female screw 44 of the inner tube 40.

The flange portion 542 is a disk-shaped portion formed so as to project outward in the radial direction from the cylindrical portion 541. The flange portion 542 comes in contact with the end surface 45P of the end 45 of the inner tube 40 on one side (see FIG. 5).

Further, the connecting member 54 has a seal member 545 which suppresses the outflow of oil in a portion between the connecting member 54 and the inner tube 40 and a seal member 546 which suppresses the outflow of oil in a portion between the connecting member 54 and the first cylinder 51.

Further, in the front fork 21, the inner tube 40 holds the first cylinder 51 via the connecting member 54 described above.

Axle Holder 60

As illustrated in FIG. 3, the axle holder 60 (an example of a connecting member) includes an axle hole 61 connected to the axle of the front wheel 2, a mounting portion 62 to which a brake caliper (not illustrated) is mounted, a first holding unit 63 which holds the damping force generating unit 71, and a second holding unit 64 which holds the pressurizing unit 72. In addition, the axle holder 60 includes the first communication hole 65 which connects the flow path 513 and the damping force generating unit 71, the second communication hole 66 which connects the second oil chamber Y2 of the second cylinder 52 and the damping force generating unit 71, and a third communication hole 67 which connects the damping force generating unit 71 and the pressurizing unit 72

Further, the axle holder 60 has a connecting portion 68 forming a connection portion with various parts forming the second unit 21B.

As illustrated in FIG. 5, the connecting portion 68 has a cylindrical portion 681 and a protruding portion 682 (an example of a space forming portion) protruding inward in the radial direction.

The cylindrical portion 681 is arranged so as to surround the other end of the inner tube 40. The inner diameter of the cylindrical portion 681 is substantially uniform along the axial direction. An inner diameter N1 of the cylindrical portion 681 is larger than the second outer diameter D12 of the inner tube 40 and smaller than the first outer diameter D11.

Further, an outer diameter G1 at one end 683 of the cylindrical portion 681 is larger than the first outer diameter D11 of the inner tube 40.

The cylindrical portion 681 has an end surface 683P at the end 683 (an example of a second contact portion) on one side. The end surface 683P is an annular surface. The end surface 683P is a surface facing one side in the axial direction and is substantially orthogonal to the inner peripheral surface 681b of the cylindrical portion 681. That is, an angle θ3 formed by the end surface 683P with respect to the inner peripheral surface 681b is approximately 90° (θ3=90°).

However, in the first embodiment, the end surface 683P may be a surface facing one side in the axial direction and the angle θ3 formed with respect to the inner peripheral surface 681b may be larger than 0° and smaller than 180° (0°<θ3<180°).

The end surface 683P is set at an angle so as to extend along the step surface 41P of the inner tube 40 and is substantially parallel to the step surface 41P of the inner tube 40 in the first embodiment.

Further, the cylindrical portion 681 has the female screw 684 on the inner peripheral portion. The female screw 684 forms a connection portion with the male screw 42 of the inner tube 40. The female screw 684 is formed with a predetermined distance from the end 683 toward the other side and a predetermined distance from the protruding portion 682 toward the other side.

Further, the cylindrical portion 681 is provided with a seal member 685 which suppresses the outflow of oil from the inner tube 40. The seal member 685 is provided on the other side of the female screw 684 and on one side of the protruding portion 682. The seal member 685 is provided on the outer peripheral portion (third region A13 (see FIG. 4)) of the end 45 on the other side of the inner tube 40.

The protruding portion 682 projects in an annular shape toward the inside in the radial direction. The amount of protrusion of the protruding portion 682 is about the same as the thickness B13 (see FIG. 4) on the other side of the inner tube 40.

The protruding portion 682 forms a space in the axial direction with the end 45 of the inner tube 40. That is, the protruding portion 682 and the end surface 45P are not in contact. The inner tube 40 has the flange portion 542 of the connecting member 54 arranged on the other side. In this way, even when another member is interposed between the inner tube 40 and the protruding portion 682 in the axial direction, the protruding portion 682 does not come into contact with other members (flange portion 542 in the example of the first embodiment). Specifically, a gap C1 is provided between the protruding portion 682 and the end 45 with the flange portion 542 interposed therebetween.

Damping Force Generating Unit 71

As illustrated in FIG. 3, the damping force generating unit 71 generates a damping force by giving a fluid resistance to the flow of oil generated in response to the expansion/contraction operation of the front fork 21. The damping force generating unit 71 generates a damping force by forming a flow path through which oil flows while opening the valve. The damping force generating unit 71 generates a damping force with respect to both the oil flow during expansion and compression of the front fork 21. Further, the damping force generating unit 71 is provided with an adjusting mechanism for adjusting the magnitude of the damping force.

Pressurizing Unit 72

As illustrated in FIG. 3, the pressurizing unit 72 forms a pressurizing chamber in which gas is filled on one side of a free piston 721 and an oil reservoir in which oil flows with respect to the damping force generating unit 71 on the other side of the free piston 721. The pressurizing unit 72 can pressurize the oil flowing through the front fork 21 according to the pressure in the pressurizing chamber.

Connection Between Inner Tube 40 and Axle Holder 60

As illustrated in FIG. 5, in the front fork 21, the male screw 42 of the inner tube 40 and the female screw 684 of the axle holder 60 are connected by screwing. When assembling the front fork 21, first, the inner tube 40 is inserted into the connecting portion 68 of the axle holder 60 and the screw is tightened. Then, the inner tube 40 and the axle holder 60 are close to each other in the axial direction. Finally, the step surface 41P of the inner tube 40 and the end surface 683P of the axle holder 60 come into contact with each other. Then, at least when the front fork 21 is not loaded, the step surface 41P of the inner tube 40 and the end surface 683P of the axle holder 60 are always in contact with each other.

Further, in the front fork 21, in a state where the step surface 41P of the inner tube 40 and the end surface 683P of the axle holder 60 are in contact with each other, an axial space is formed between the end 45 of the inner tube 40 and the protruding portion 682 of the axle holder 60. This prevents insufficient contact between the step surface 41P and the end surface 683P, for example, a gap is created between the step surface 41P and the end surface 683P.

Subsequently, the change in rigidity when a load is applied to the front fork 21 in the first embodiment will be described.

Figure 12:
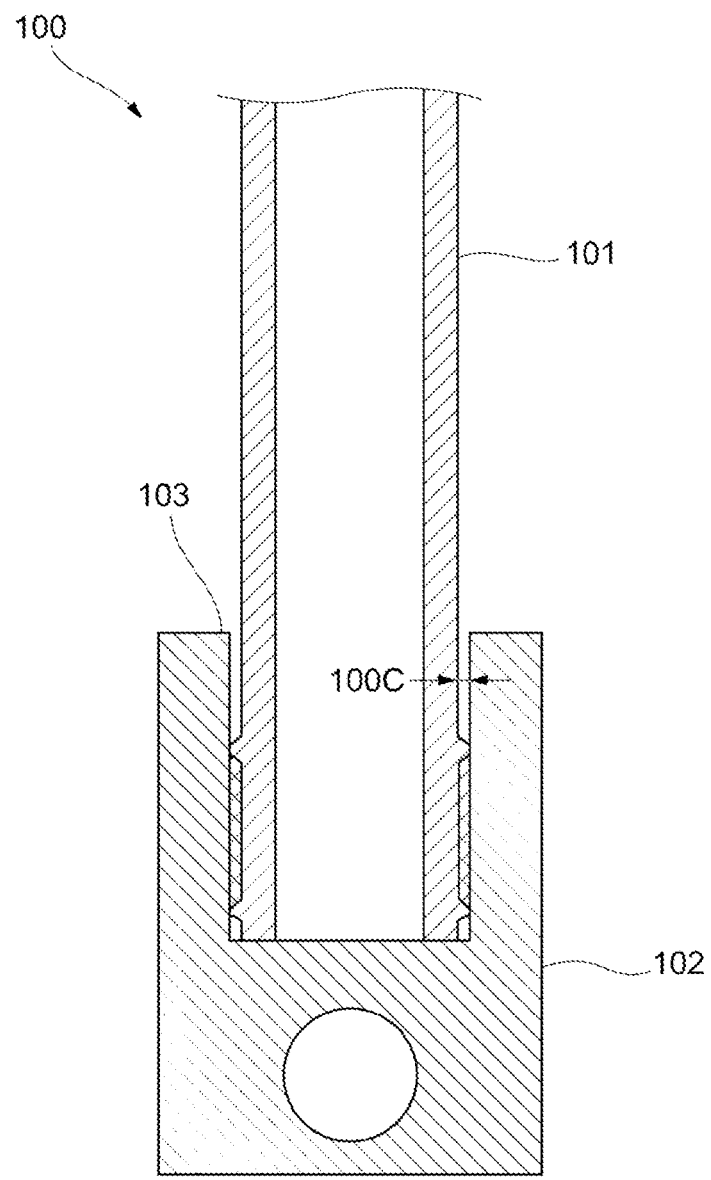
FIG. 12 is a diagram illustrating the front fork 100 of the comparative example.

FIG. 12 is a diagram illustrating a front fork 100 of a comparative example. An up-down direction of the paper surface in FIG. 12 may be referred to as an "axial direction" and a left-right direction of the paper surface may be referred to as a "radial direction".

Figure 6:
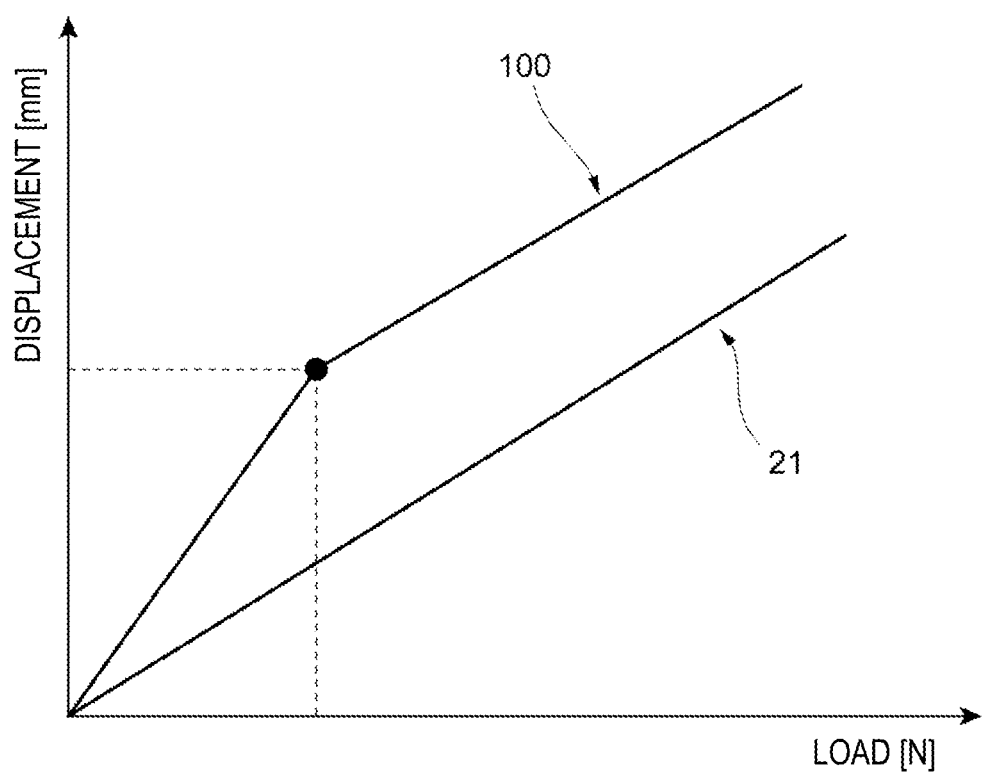
FIG. 6 is a diagram illustrating a displacement amount of a front fork 100 of a comparative example and the front fork 21 according to a load.

FIG. 6 is a diagram illustrating the amount of displacement of the front fork 100 of the comparative example and the front fork 21 according to the load.

The front fork 100 of the comparative example will be described with reference to FIG. 12. In the front fork 100 of the comparative example, unlike the front fork 21 of the first embodiment, the inner tube 40 does not have the step portion 41. That is, in the front fork 100 of the comparative example, the outer diameter of an inner tube 101 is the same along the axial direction. In the front fork 100 of the comparative example, an axle holder 102 is screwed to the inner tube 101. Further, in the front fork 100 of the comparative example, a gap 100C is provided between the inner tube 101 and an end 103 of the axle holder 102 in the radial direction for assembling.

As illustrated in FIG. 6, the front fork 100 of the comparative example is deformed (displaced) according to the magnitude of the bending load when a bending load is applied to the front fork 100 such as when a brake is applied during traveling. However, in the front fork 100 of the comparative example, the rate of change of the displacement amount according to the bending load changes depending on the presence or absence of the gap 100C between the inner tube 101 and the end 103 of the axle holder 102.

That is, in the front fork 100 of the comparative example, the gap 100C is maintained between the inner tube 101 and the end 103 of the axle holder 102 while the bending load is less than a predetermined value. However, when the bending load exceeds a predetermined value, the end portion 103 and the inner tube 101 come into contact with each other. Therefore, as illustrated in FIG. 6, in the front fork 100 of the comparative example, the rigidity of the front fork itself changes according to the magnitude of the bending load.

On the other hand, since the axial force is applied to the end 683 and the step portion 41 by screwing, the end 683 of the axle holder 60 is always in contact with the step portion 41 of the inner tube 40 of the front fork 21. As a result, as illustrated in FIG. 6, in the front fork 21, the rate of change of the displacement amount according to the bending load becomes constant and the change in rigidity due to the bending load is suppressed.

Figure 7:
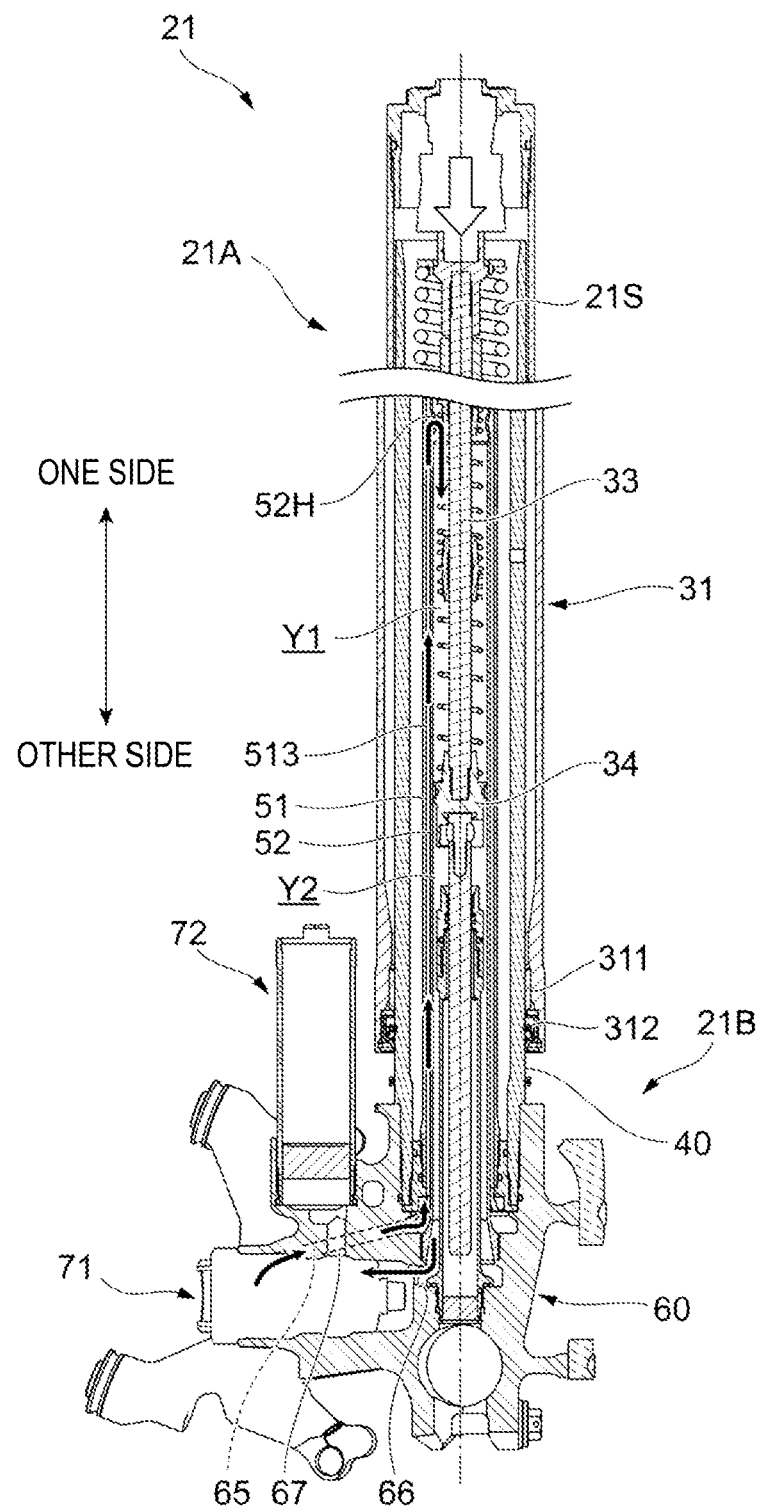
FIG. 7 is a diagram illustrating an oil flow during a compression stroke of the front fork 21.

FIG. 7 is an explanatory diagram of the oil flow during the compression process of the front fork 21.

Figure 8:
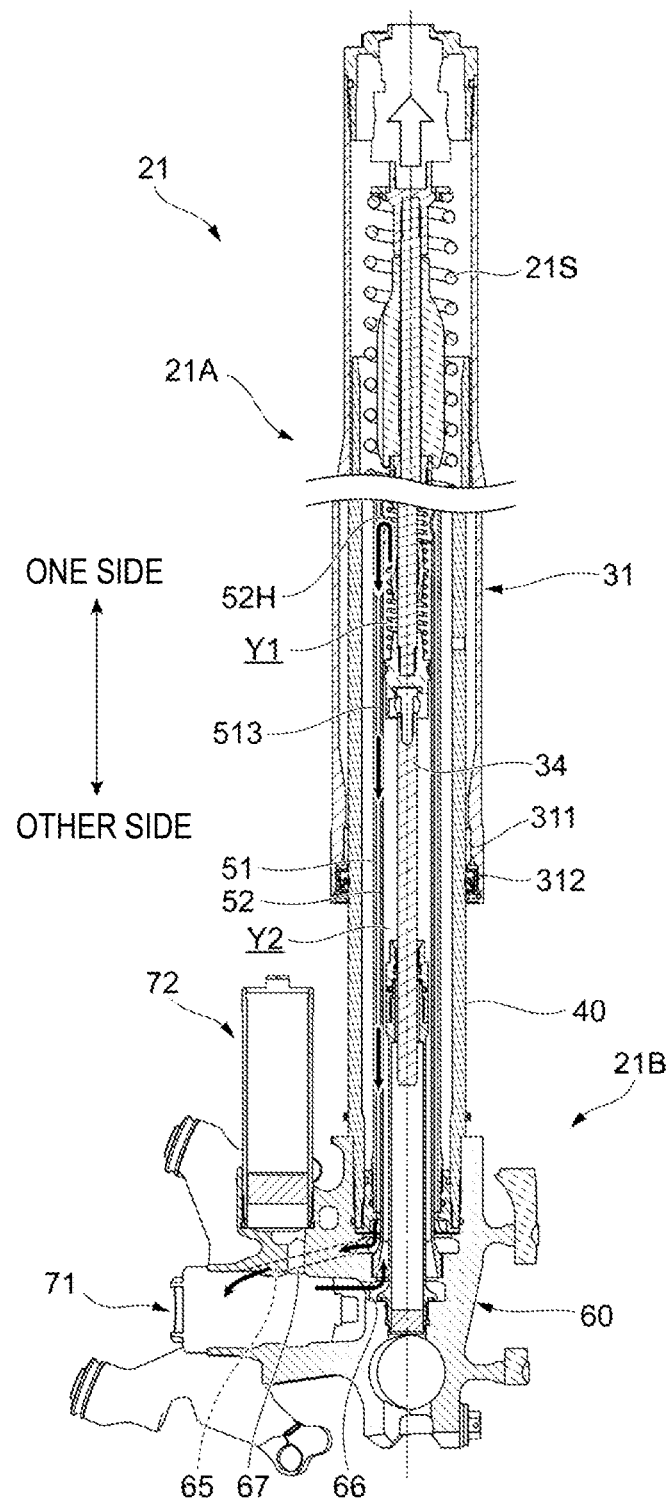
FIG. 8 is a diagram illustrating an oil flow during an extension stroke of the front fork 21.

FIG. 8 is an explanatory diagram of the oil flow during the extension process of the front fork 21.

During Compression Stroke

As illustrated in FIG. 7, in the compression stroke of the front fork 21, the first unit 21A and the second unit 21B move in a direction relatively close to each other in the axial direction and the piston 34 moves toward the other side. As the piston 34 moves to the other side, the oil pressure in the second oil chamber Y2 in the second cylinder 52 increases. The oil in the second oil chamber Y2 where the pressure increased in this way flows through the second communication hole 66 and flows into the damping force generating unit 71, and the damping force is generated by the flow of the oil being throttled by the damping force generating unit 71. Next, the oil leaving the damping force generating unit 71 flows through the first communication hole 65 and the flow path 513. The oil flowing through the flow path 513 flows into the first oil chamber Y1 of the second cylinder 52 through the through-hole 52H.

During Extension Stroke

As illustrated in FIG. 8, in the extension stroke of the front fork 21, the first unit 21A and the second unit 21B move in a direction relatively distant in the axial direction and the piston 34 moves toward one side. As the piston 34 moves to one side, the pressure of the oil in the first oil chamber Y1 in the second cylinder 52 increases. The oil in the first oil chamber Y1 whose pressure is increased in this way flows out to the flow path 513 through the through-hole 52H. The oil flowing through the flow path 513 flows through the first communication hole 65 and flows into the damping force generating unit 71. Then, the damping force is generated by the flow of the oil being throttled by the damping force generating unit 71. Next, the oil leaving the damping force generating unit 71 flows into the second oil chamber Y2 of the second cylinder 52 through the second communication hole 66.

Second Embodiment

Next, a front fork 221 of a second embodiment will be described. In the description of the second embodiment, the same components as those of the first embodiment described above are designated by the same reference numerals and letters and detailed description thereof will be omitted.

Figure 9:
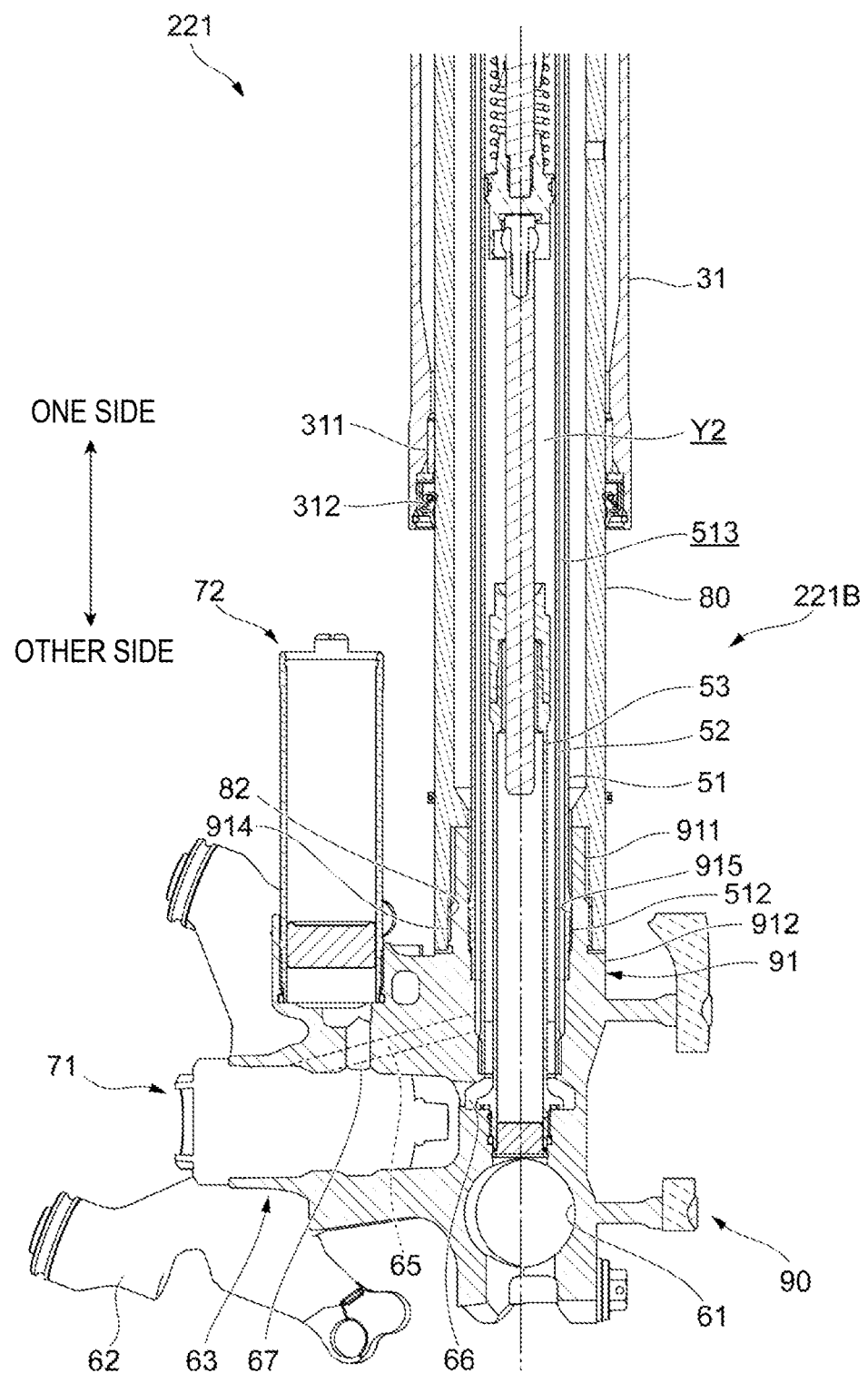
FIG. 9 is a diagram illustrating a second unit 221B.

FIG. 9 is a diagram illustrating a second unit 221B.

Figure 10:
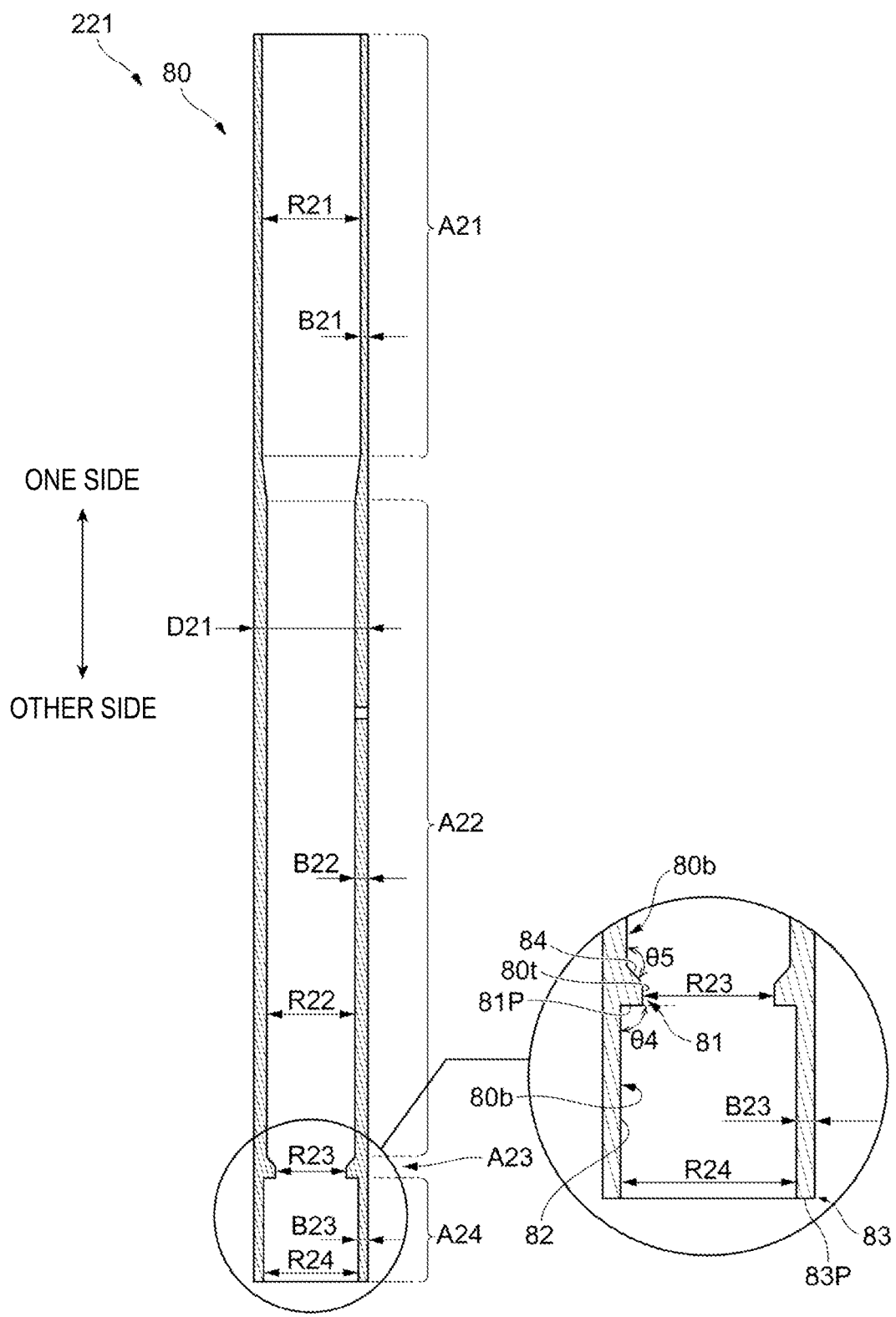
FIG. 10 is a cross-sectional view of an inner tube 80.

FIG. 10 is a cross-sectional view of an inner tube 80.

Figure 11:
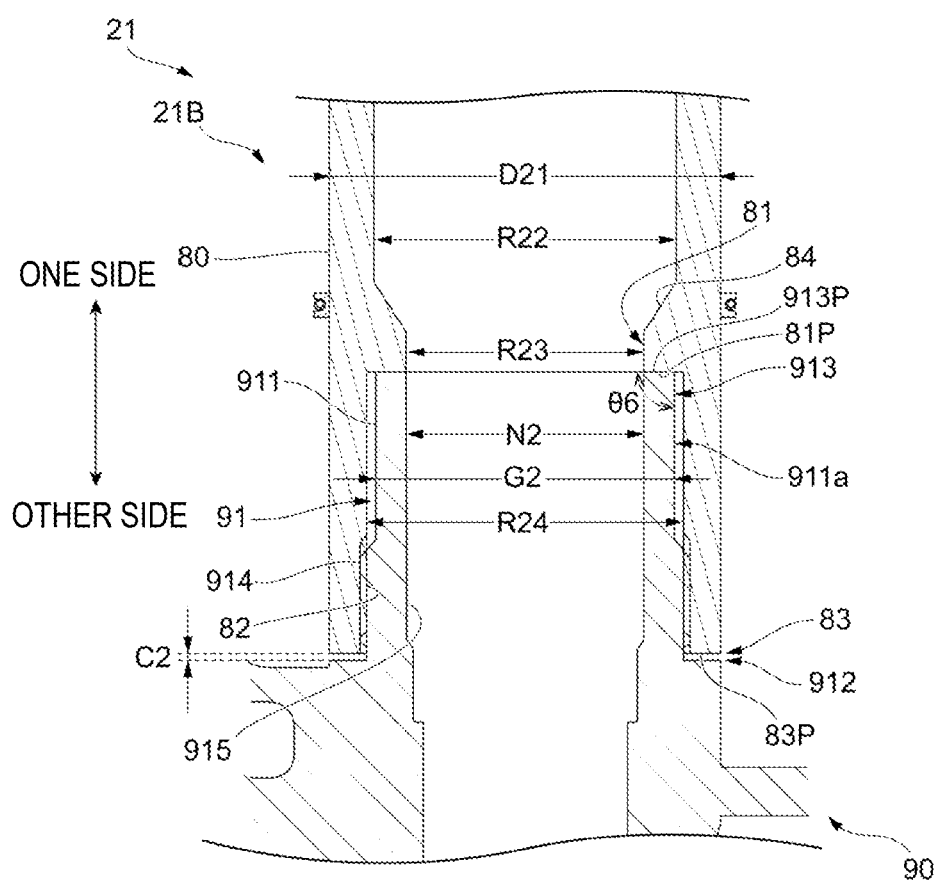
FIG. 11 is a diagram illustrating the inner tube 80 and an axle holder 90.

FIG. 11 is a diagram illustrating an inner tube 80 and an axle holder 90.

As illustrated in FIG. 9, in the front fork 221 of the second embodiment, the inner tube 80 and the axle holder 90 are respectively different from the inner tube 40 and the axle holder 60 of the first embodiment. In particular, in the front fork 221 of the second embodiment, the axle holder 90 and the inner tube 80 are connected inside the inner tube 80 in the radial direction.

Inner Tube 80

The basic configuration of the inner tube 80 is the same as that of the inner tube 40 of the first embodiment. Hereinafter, the differences from the inner tube 40 of the first embodiment will be mainly described.

As illustrated in FIG. 10, the inner tube 80 has a first region A21, a second region A22, a third region A23, and a fourth region A24 from one side to the other in the axial direction.

The first region A21 is a region in which the outer diameter is a largest outer diameter D21 in the inner tube 80 and the inner diameter is a largest first inner diameter R21 in the inner tube 80.

The second region A22 is a region in which the outer diameter is an outer diameter D21 and the inner diameter is a second inner diameter R22 smaller than the first inner diameter R21.

The third region A23 is a region in which the outer diameter is the outer diameter D21, the inner diameter is smaller than the second inner diameter R22, and the inner diameter is a smallest third inner diameter R23 in the inner tube 80.

The fourth region A24 is a region in which the outer diameter is the outer diameter D21 and the inner diameter is a fourth inner diameter R24 smaller than the first inner diameter R21 and larger than the second inner diameter R22.

The outer diameter (outer diameter D21) of the inner tube 80 is uniform along the axial direction. Even in the inner tube 80, by making the outer diameter of the inner tube 80 uniform in the axial direction, for example, surface treatment and polishing for forming a moving portion of the outer tube 31 (see FIG. 9) and a sliding surface of the bush 311 are facilitated.

The first region A21 forms a region in which the first spring 21S (see FIG. 2) expands or contracts inward in the radial direction.

The second region A22 has a thickness B22 larger than, for example, a thickness B21 in the first region A21 by making it smaller than the first inner diameter R21. As a result, the second region A22 has a predetermined rigidity.

In the third region A23, the third inner diameter R23 is smaller than the fourth inner diameter R24 of the fourth region A24 (R23<R24). The inner tube 80 has a step portion 81 (an example of a first contact portion) on the inner circumference thereof. The step portion 81 is a step connecting an inner peripheral surface 80b of the inner tube 80 and a protruding surface 80t protruding inward in the radial direction of the inner tube 80 from the inner peripheral surface 80b.

The step portion 81 has a step surface 81P which is a surface facing the other side in the axial direction. Since the inner tube 80 is cylindrical, the step surface 81P is an annular surface. Further, the step surface 81P is substantially orthogonal to the inner peripheral surface 80b in the fourth region A24. That is, an angle $\theta 4$ formed by the step surface 81P with respect to the inner peripheral surface 80b is approximately 90° ($\theta 4=90°$).

However, in the second embodiment, the step surface 81P may be a surface facing the other side in the axial direction and the angle $\theta 4$ formed with respect to the inner peripheral surface 80b may be larger than 0° and smaller than 180° ($0°<\theta 4<180°$).

Further, the inner tube 80 has a tapered portion 84 on its inner circumference between the second region A22 and the third region A23. In the tapered portion 84, an angle $\theta 5$ formed by the inner peripheral surface 80b in the second region A22 is larger than 90° and smaller than 180° ($90°<\theta 4<180°$). The tapered portion 84 gently connects the inner circumference of the third region A23 and the inner circumference of the second region A22.

The fourth region A24 of the inner tube 80 is a region forming a connecting portion with the axle holder 90 (see FIG. 9) on the inner circumference. A female screw 82 is formed on the inner circumference of the fourth region A24. The female screw 82 forms a connection portion with a male screw 914 of the axle holder 90 described below. The female screw 82 is formed with a predetermined distance from the step portion 81 toward the other side and also formed at a predetermined distance from the other end 83 of the inner tube 80 toward one side.

As illustrated in FIG. 10, the inner tube 80 has an end surface 83P at the end 83 on the other side. Since the inner tube 80 is cylindrical, the end surface 83P is an annular surface. Further, the end surface 83P is a surface facing the other side in the axial direction. That is, the end surface 83P is substantially orthogonal to the inner peripheral surface 80b of the fourth region A24.

The end surface 83P exists on the most other side in the axial direction among the faces facing the other side in the inner tube 80.

Axle Holder 90

As illustrated in FIG. 11, the basic configuration of the axle holder 90 is the same as that of the axle holder 60 of the first embodiment. Hereinafter, the differences from the axle holder 60 of the first embodiment will be mainly described.

The axle holder 90 (an example of a connecting member) has a connecting portion 91 which forms a connection portion with various parts forming the second unit 21B. The connecting portion 91 has a cylindrical portion 911 and a flange portion 912 (an example of a space forming portion) protruding outward in the radial direction.

An outer diameter G2 of the cylindrical portion 911 is substantially uniform along the axial direction. The outer diameter G2 is smaller than the fourth inner diameter R24 of the fourth region A24 of the inner tube 80 and larger than the third inner diameter R23 of the third region A23.

The cylindrical portion 911 has the male screw 914 on the outer peripheral portion. The male screw 914 forms a connection portion with the female screw 82 of the inner tube 80. The male screw 914 is formed with a predetermined distance from an end 913 toward the other side and also formed with a predetermined distance from the flange portion 912 toward one side.

Further, an inner diameter N2 of the cylindrical portion 911 is substantially uniform along the axial direction. The cylindrical portion 911 has a female screw 915 at the inner peripheral portion. The female screw 915 forms a connection portion with the male screw 512 of the first cylinder 51 (see FIG. 9).

Further, the cylinder portion 911 has an end surface 913P at an end portion 913 (an example of a second contact portion) on one side. In the second embodiment, the end surface 913P is an annular surface. Further, the end surface 913P is a surface facing one side in the axial direction and is substantially orthogonal to the outer peripheral surface 911a of the cylindrical portion 911. That is, an angle $\theta 6$ formed by the end surface 913P with respect to the outer peripheral surface 911a is approximately 90° ($\theta 6=90°$).

However, in the second embodiment, the end surface 913P may be a surface facing one side in the axial direction and the angle $\theta 6$ formed with respect to the outer peripheral surface 911a may be larger than 0° and smaller than 180° ($0°<\theta 6<180°$).

The end surface 913P is set at an angle so as to extend along the step surface 81P of the inner tube 80 and is substantially parallel to the step surface 81P of the inner tube 80 in the second embodiment.

The width of the flange portion 912 is comparable to the thickness B23 (see FIG. 10) on the other side of the inner tube 80. Then, the flange portion 912 forms an axial space between the flange portion 912 and the end portion 83 of the inner tube 80. Specifically, the flange portion 912 forms a gap C2 with respect to the end portion 83. That is, the flange portion 912 and the end surface 83P are not in contact with each other.

Connection Between Inner Tube 80 and Axle Holder 90

As illustrated in FIG. 11, in the front fork 221, the female screw 82 of the inner tube 80 and the male screw 914 of the axle holder 90 are connected by screwing. When assembling the front fork 221, first, the connection portion 91 of the axle holder 90 is inserted into the inner tube 80 and the screw is tightened. Therefore, the inner tube 80 and the axle holder 90 are closer to each other in the axial direction. Finally, the step surface 81P of the inner tube 80 and the end surface 913P of the axle holder 90 come into contact with each other. Then, at least when the front fork 221 is not loaded, the step surface 81P of the inner tube 80 and the end surface 913P of the axle holder 90 are always in contact with each other.

Since axial force is applied to the end 913 and the step portion 81 by screwing, in the front fork 221, the end portion 913 of the axle holder 90 is always in contact with the step portion 81 of the inner tube 80. As a result, in the front fork 221, the rate of change of the displacement amount according to the bending load becomes constant and the change in rigidity due to the bending load is suppressed.

In the first embodiment and the second embodiment, the so-called inverted front fork has been described as an example, but the front fork of the present invention is not limited to the inverted front fork. For example, in an upright front fork, the inner tube (an example of the first tubular member) is arranged on the handle bar 12 side and the outer tube (an example of the second tubular member) is arranged on the front wheel 2 side. Then, in the upright front fork, a connecting member for connecting the front wheel 2 and the outer tube may be provided separately from the outer tube. In this case, the step portion 41 of the first embodiment and the step portion 81 of the second embodiment may be formed on the outer tube. Further, the connecting member may be provided with a space forming portion for forming a space between the connecting member and the end of the inner tube.

Further, for example, in the first embodiment, the end surface 683P of the end 683 and the end surface 45P of the end 45 are each formed as continuous surfaces in the circumferential direction, but the invention is not limited to this example. Either or both of the end surface 683P of the end 683 and the end surface 45P of the end 45 may be composed of a plurality of surfaces formed intermittently in the circumferential direction, for example. This content is the same in the front fork 221 of the second embodiment.

REFERENCE SIGNS LIST

21 front fork
31 outer tube
40 inner tube
41 step portion
41P step surface
45 end
45P end surface
60 axle holder
68 connecting portion
682 protruding portion
683 end
683P end surface

What is claimed is:

1. A front fork, comprising:
a tubular outer tube which is provided on one side, which is a side on which a steering unit is arranged in an axial direction;
a tubular inner tube which is provided on the other side, which is a side on which a wheel is arranged in the axial direction, and inside the outer tube and is relatively movably connected to the outer tube; and
a connecting member which connects the wheel and the inner tube, wherein
the inner tube includes a first contact portion which has a first surface facing the other side and an end surface provided at an end of the inner tube on the other side, said first surface being located further on the one side than the end surface in the axial direction,
the first contact portion is configured to contact the connecting member, and
the connecting member includes:
a second contact portion having a second surface facing the one side, which is an end surface provided in an end on the one side of the connecting member, and coming into contact with the first contact portion; and
a space forming portion which forms a space against the end surface of the inner tube in the axial direction in a state where the first surface of the first contact portion and the second surface of the second contact portion are in contact with each other.

2. The front fork according to claim 1, wherein
the first contact portion is provided on an outer peripheral side of the inner tube and the second contact portion of the connecting member comes in contact with the first contact portion on the outer peripheral side of the inner tube.

3. The front fork according to claim 2, wherein
the inner tube has a first outer diameter portion having the largest outer diameter in the inner tube and a second outer diameter portion having a smaller outer diameter than that of the first outer diameter portion, and
the first surface of the first contact portion is provided between the first outer diameter portion and the second outer diameter portion of the inner tube.

4. The front fork according to claim 3, wherein
the inner tube includes a first inner diameter portion having a predetermined inner diameter and provided inside the first outer diameter portion and a second inner diameter portion having an inner diameter smaller than that of the first inner diameter portion and provided inside the second outer diameter portion.

5. The front fork according to claim 4, wherein
the inner tube has a tapered portion connecting the first inner diameter portion and the second inner diameter portion.

6. The front fork according to claim 1, wherein
the first contact portion is provided on an inner peripheral side of the inner tube and the second contact portion of the connecting member comes in contact with the first contact portion on the inner peripheral side of the inner tube.

7. The front fork according to claim 6, wherein
the first contact portion protrudes inward in a radial direction on the inner peripheral side of the inner tube and the other side of the first contact portion is provided with the first surface, and further the one side of the first contact portion is provided with a tapered portion.

8. The front fork according to claim 1, wherein
the inner tube is connected to the connecting member by fastening a screw.

9. The front fork according to claim 2, wherein
the inner tube is connected to the connecting member by fastening a screw.

10. The front fork according to claim 3, wherein
the inner tube is connected to the connecting member by fastening a screw.

11. The front fork according to claim 4, wherein
the inner tube is connected to the connecting member by fastening a screw.

12. The front fork according to claim 5, wherein
the inner tube is connected to the connecting member by fastening a screw.

13. The front fork according to claim 6, wherein
the inner tube is connected to the connecting member by fastening a screw.

14. The front fork according to claim 7, wherein
the inner tube is connected to the connecting member by fastening a screw.

15. A front fork, comprising:
a first tubular member which is provided on one side, which is a side on which a steering unit is arranged in an axial direction;
a second tubular member which is coaxially provided with the first tubular member on the other side, which is a side on which a wheel is arranged in the axial direction, and is relatively movably connected to the first tubular member; and
a connecting member which connects the wheel and the second tubular member, wherein
the second tubular member includes a first contact portion which has a first surface facing the other side and an end surface provided at an end of the second tubular member on the other side, said first surface being located further on the one side than the end surface in the axial direction, the first contact portion is configured to contact the connecting member, and the connecting member includes:

a second contact portion having a second surface facing the one side, which is an end surface provided in an end on the one side of the connecting member, and coming into contact with the first contact portion; and a space forming portion which forms a space against the end surface of the second tubular member in the axial direction in a state where the first surface of the first contact portion and the second surface of the second contact portion are in contact with each other.

* * * * *